(12) United States Patent
Qian et al.

(10) Patent No.: US 11,964,472 B2
(45) Date of Patent: Apr. 23, 2024

(54) APPLYING MARKS TO A SURFACE OF A MEDIUM

(71) Applicant: Hewlett-Packard Development Company, L.P., Spring, TX (US)

(72) Inventors: Li Qian, Sant Cugat del Valles (ES); Diego Lopez Ubieto, Sant Cugat del Valles (ES); Francisco Guerrero Carvajal, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 361 days.

(21) Appl. No.: 17/261,048

(22) PCT Filed: Nov. 28, 2018

(86) PCT No.: PCT/US2018/062720
§ 371 (c)(1),
(2) Date: Jan. 18, 2021

(87) PCT Pub. No.: WO2020/112097
PCT Pub. Date: Jun. 4, 2020

(65) Prior Publication Data
US 2021/0323324 A1    Oct. 21, 2021

(51) Int. Cl.
| | | |
|---|---|---|
| B41J 11/46 | (2006.01) | |
| B41J 11/42 | (2006.01) | |
| B41J 11/44 | (2006.01) | |
| G01P 3/38 | (2006.01) | |
| G06V 10/22 | (2022.01) | |

(52) U.S. Cl.
CPC ............... *B41J 11/46* (2013.01); *B41J 11/42* (2013.01); *B41J 11/44* (2013.01); *G01P 3/38* (2013.01); *G06V 10/225* (2022.01)

(58) Field of Classification Search
CPC ... B41J 11/04; B41J 11/42; B41J 11/44; B41J 11/01; G01P 3/38; G06V 10/225
See application file for complete search history.

(56) References Cited

U.S. PATENT DOCUMENTS

| | | |
|---|---|---|
| 6,190,066 B1 | 2/2001 | Ishigouoka et al. |
| 6,585,341 B1 | 7/2003 | Walker et al. |
| 7,735,993 B2 | 6/2010 | Silverbrook et al. |
| 8,593,650 B2 * | 11/2013 | Iio ........................ G06V 10/993 358/1.18 |
| 2005/0013647 A1 * | 1/2005 | Claramunt ............... B41J 11/46 400/709 |
| 2008/0247802 A1 | 10/2008 | Long et al. |
| 2009/0293750 A1 | 12/2009 | Haenni et al. |
| 2013/0258356 A1 | 10/2013 | Sugimura et al. |
| 2016/0011224 A1 | 1/2016 | Pollack |
| 2018/0281456 A1 | 10/2018 | McConville et al. |

FOREIGN PATENT DOCUMENTS

| | | |
|---|---|---|
| CN | 101654013 | 2/2010 |
| JP | 2017178506 | 10/2017 |
| WO | WO-2001054854 | 8/2001 |

\* cited by examiner

*Primary Examiner* — Geoffrey S Mruk

(57) ABSTRACT

An optical sensor device (10) includes an application module (12) for applying an irregular pattern of marks to a surface of a medium and an optical detector module (14). The optical detector module (14) acquires images of the applied marks and may determine an advancement speed of the medium based on the acquired images.

8 Claims, 4 Drawing Sheets

APPLYING MARKS TO A SURFACE OF A MEDIUM

BACKGROUND

For detection of the advancement and position of a printable medium in a printer, optical sensors may be used. These sensors generally acquire images of the backside of a printable medium and determine the advancement speed of the medium by extracting features, such as structural patterns, from the acquired images and comparing the positions of corresponding features in subsequently acquired images.

BRIEF DESCRIPTION OF DRAWINGS

Examples will now be described, by way of non-limiting example, with reference to the accompanying drawings, in which.

DETAILED DESCRIPTION

Figure 1:
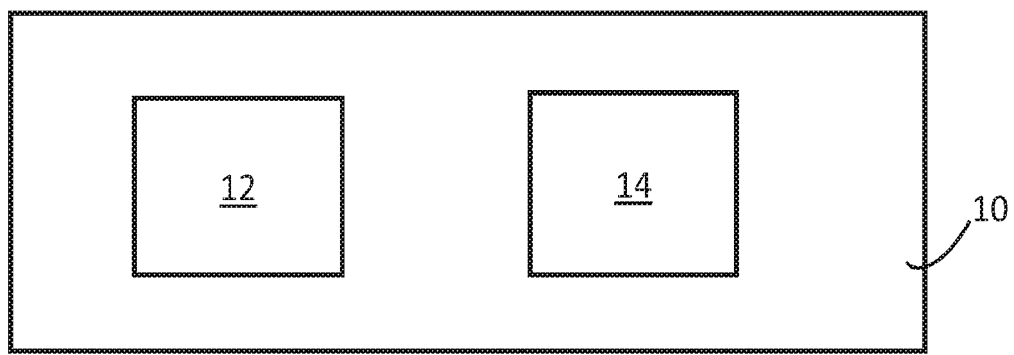
FIG. 1 is a simplified schematic of an example of an optical sensor device.

As shown in FIG. 1, an optical sensor device 10 comprises an application module 12 and an optical sensor module 14. The optical sensor device may detect an advancement speed of a printable medium, wherein the printable medium is advanced relative to the optical sensor device 10 along the direction of the arrow in FIG. 1. The application module 12 applies an irregular pattern of marks to a surface of the medium. The optical detector module 14 acquires images of the applied marks and determines an advancement speed of the medium based on the acquired images.

Thus, the optical sensor device 10 can accurately detect the advancement speed of a printable medium, such as a medium formed from a plastics material such as PET (polyethylene terephthalate) or PP (polypropylene) which has no surface pattern or a textile medium, which has a very regular surface pattern. The applied irregular marks can be detected in the acquired images, and an accurate movement direction and movement speed of the printable medium can be determined by comparing subsequent acquired images and identifying corresponding marks in each image.

Figure 2:
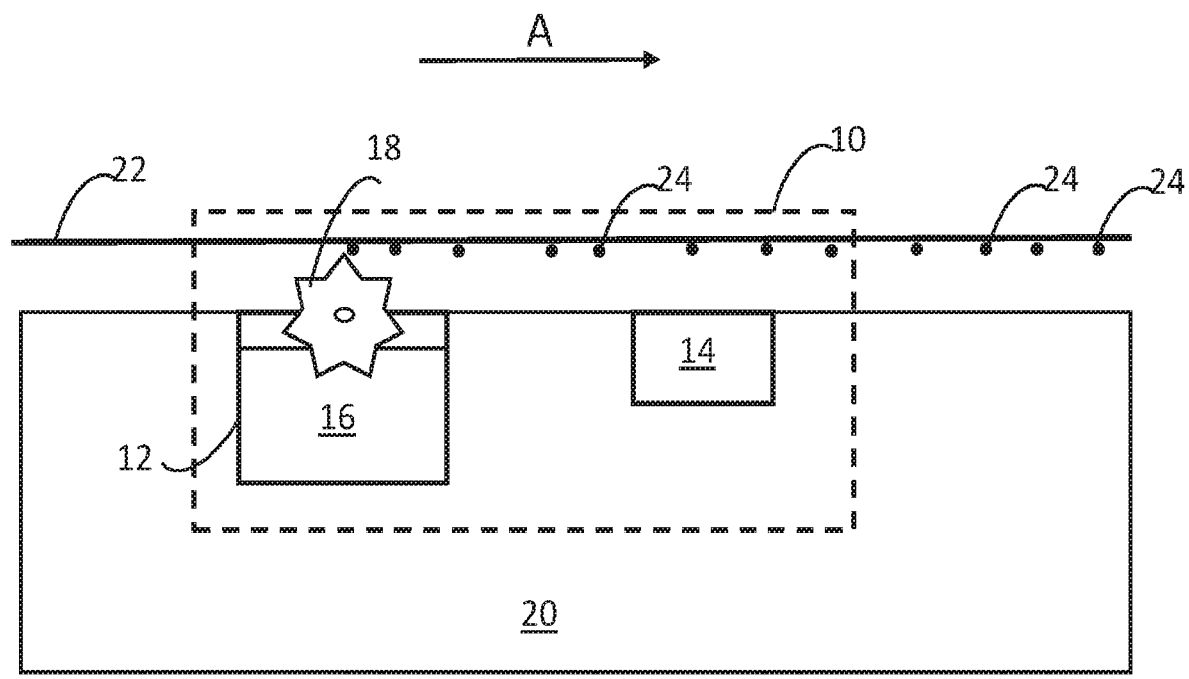
FIG. 2 is a schematic view of an example of an optical sensor device provided in a printer platen.

As shown in FIG. 2, an example of an optical sensor device 10 can be provided in a printer platen 20 of a print apparatus. In this example, the optical sensor device 14 may comprise any optical media advance sensor (OMAS) which is capable of determining a medium advancement speed from a series of acquired images of a medium 22 that is supported by the printer platen 20.

Therein, the surface of the medium 22 that faces away from the printer platen 20 is defined as a first or front side of the medium 22 onto which an image is to be printed. The back side of the medium 22 is a second side opposite the first side, onto which the application module 12 applies a pattern of marks in the example shown in FIG. 2.

The example application module 12 as shown in FIG. 2 comprises a reservoir 16 and a starwheel 18, which is pivotally supported such that it is partially submerged in a marking fluid provided in the reservoir 16 and that it is also in contact with the backside of the medium 22.

When the medium 22 is advanced past the application module 12 along the advancement direction shown by the arrow A in FIG. 2, it thus turns the starwheel 18 and the teeth of the starwheel 18 apply a pattern of marks 24 onto the medium 22 as the medium is advanced. Since the starwheel 18 is on contact with the medium 22, the linear movement of the medium 22 causes the starwheel 18 to rotate relative to the reservoir 16. The pattern of marks 24 is subsequently detected by the OMAS 14 as the medium 22 with the marks 24 thereon is advanced further along the advancement direction.

Since the application of marks 24 to the medium 22 by using the teeth of the starwheel 18 is a somewhat irregular process, the shapes and sizes of subsequent marks 24 show some variation, depending on the amount of marking fluid deposited onto the medium 22 by a particular tooth of the starwheel 18, and further depending on the contact force between the medium 22 and a particular tooth of the starwheel 18. Thus, the pattern of marks 24 shows a degree of irregularity, which enables the OMAS 14 to identify corresponding marks 24 in subsequently acquired images and thus to accurately determine the advancement speed of the medium 22.

Further, the contact force between the starwheel 18 and the medium 22 may vary such that the starwheel 18 may partially slip relative to the surface of the medium 22, which leads to irregularly spaced marks 24 along the advancement direction of the medium 22. The irregular distance between adjacent marks further facilitates the identification of corresponding marks 24 in acquired images by the OMAS 14, thus further increasing the accuracy of the determination of the advancement speed of the medium 22.

According to some examples, multiple reservoirs 16 and associated starwheels 18 may be provided within the imaging region of the OMAS 14 so that the irregular pattern of marks may comprise marks 24 applied by multiple starwheels 18.

Therein, the application module 12 may be provided as a kit comprising the starwheel 18 and the reservoir 16, wherein the kit may be placed closely before the OMAS 14 in the advancement direction of the medium 22 so that the marks 24 are applied shortly before the OMAS acquires images of the backside of the medium 22. According to an example, such an application module 12 kit may be placed about 2-5 cm before the OMAS 14 in the advancement direction A of the medium 22.

Figure 3A:
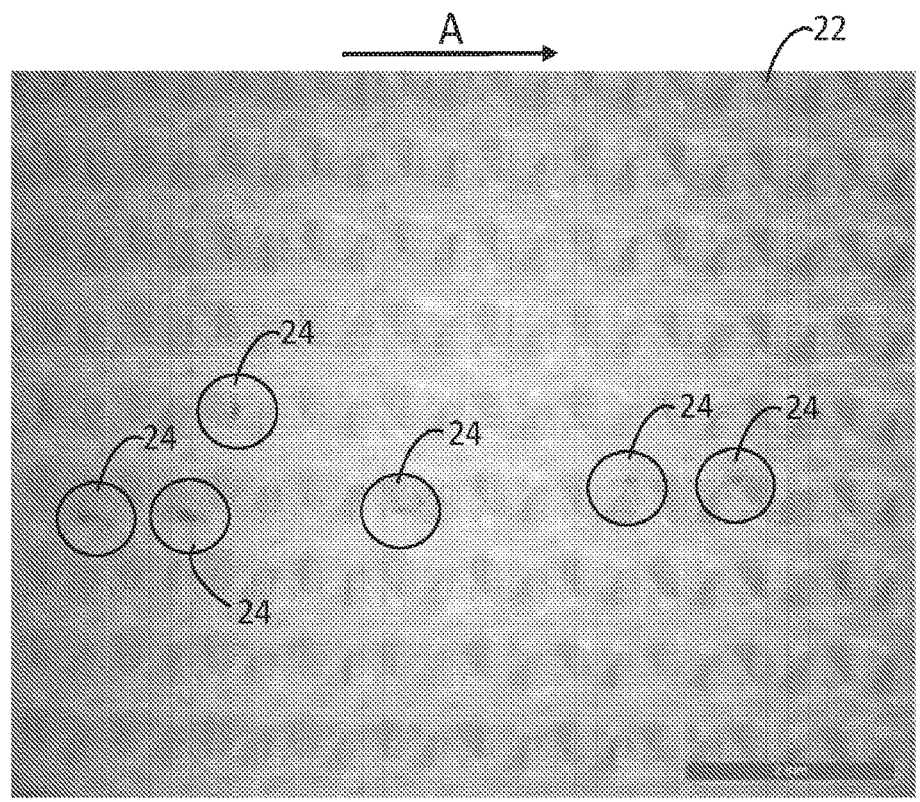
FIGS. 3A and 3B show microscopic photographic images of example patterns of marks as applied to the backside of a printable textile medium.
Figure 3B:
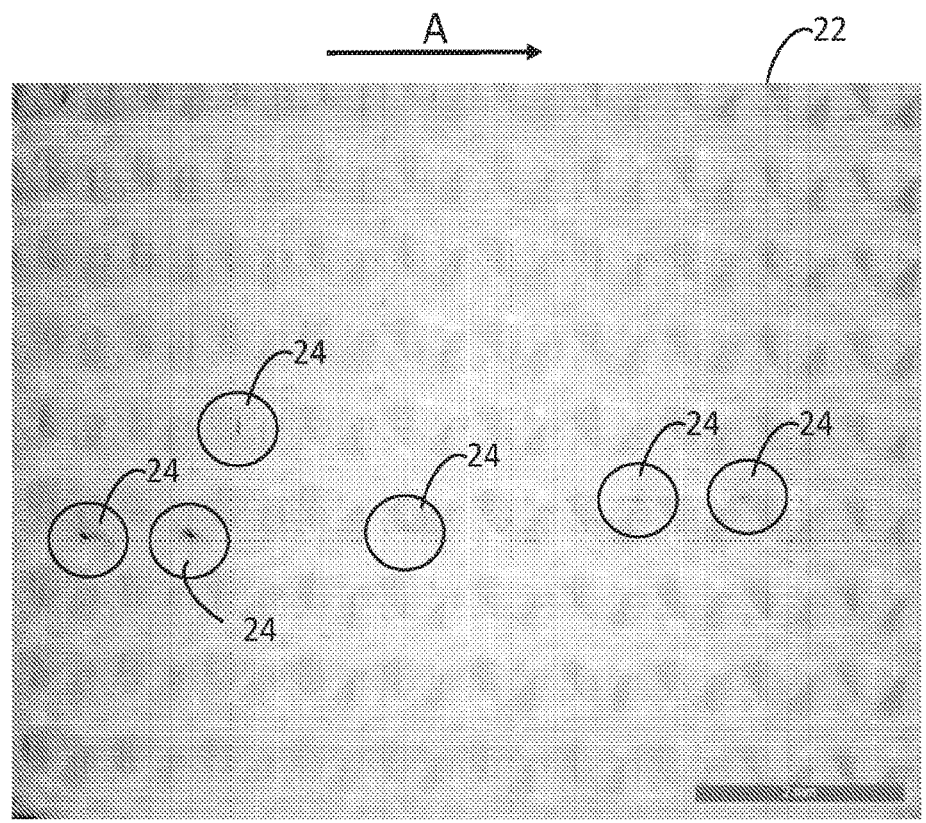

FIGS. 3A and 3B show example images acquired as microscopic photos of a pattern of marks 24 formed on a textile medium 22. Therein, FIG. 3A shows a microscopic photo in a red channel of marks 24 formed from cyan ink as an example of a marking fluid, and FIG. 3B shows a photo of the same pattern of marks 24 with higher exposure and contrast.

As shown in FIGS. 3A and 3B, the depicted example shows marks 24 applied by two application modules 12, which are spaced from each other in a direction perpendicular to the advancement direction shown as an arrow in FIGS. 3A and 3B. In the depicted example, the marks 24 are smaller than 0.2 mm in diameter, for example around 0.05-2 mm in diameter, and would thus be barely visible with the naked eye. However, as shown in FIG. 3B, a suitable choice of image acquisition parameters such as exposure time, contrast or the like may result in an image wherein the marks 24 are particularly easy to detect.

Since the marks 24 are applied to the backside of the medium 22 and do not penetrate through the medium 22, it can be ensured that the marks 24 are substantially invisible for a viewer who observes the front side of the medium 22 after printing. Even when the medium 22 is later used in an application wherein the printed medium 22 is backlit, it can be ensured that the marks 24 are invisible or barely visible to an observer. Thus, while the application of an irregular pattern of tiny marks 24 results in an improvement in the print quality due to a more accurate detection of the advancement speed and the position of the medium 22, it does not negatively affect the finished print product, since the applied marks 24 are substantially invisible to the observer.

As shown in the example depicted in FIGS. 3A and 3B, the respective sizes and shapes of the marks 24, as well as the spacing between subsequent marks 24, differ in an irregular manner. Thus, acquired images such as the photographs of FIGS. 3A and 3B can be used to accurately determine an advancement speed of the medium 22 by identifying corresponding marks 24 in subsequent images and determining an advancement amount of the medium 22 between the capture times of subsequently acquired images, even when a textile medium 22 has a very regular surface texture that would otherwise make it difficult to identify corresponding portions of acquired images of the backside of the medium 22 without any additional marks 24. Similarly, the irregular pattern or marks 24 may be applied to a medium 22 with a smooth surface, such as a PET or PP material, thus enabling the optical detection of medium advancement even when the medium 22 does not provide a surface texture.

According to further examples, the marks 24 do not need to be applied to the backside of the medium 22 by an application module 12 comprising a starwheel 18, as described above. Application modules according to further examples may e.g. be configured such that marking fluid droplets are sprayed onto the medium 22 in an irregular manner, or such that marking fluid may be applied to the backside of the medium by a different process, using e.g. a differently shaped wheel, using multiple wheels of various shapes, or using a wheel formed from a flexible material, or using a rotating brush or any other suitable structure in order to generate an irregular pattern of small marks which are barely visible or even invisible to the viewer.

Further examples of application modules 12 may comprise contact-based or non-contact based means for applying a marking fluid to the medium 22, e.g. a nozzle that spits marking fluid towards the medium 22, various contact-based means for applying marking fluid to the medium, or the like.

Figure 4:
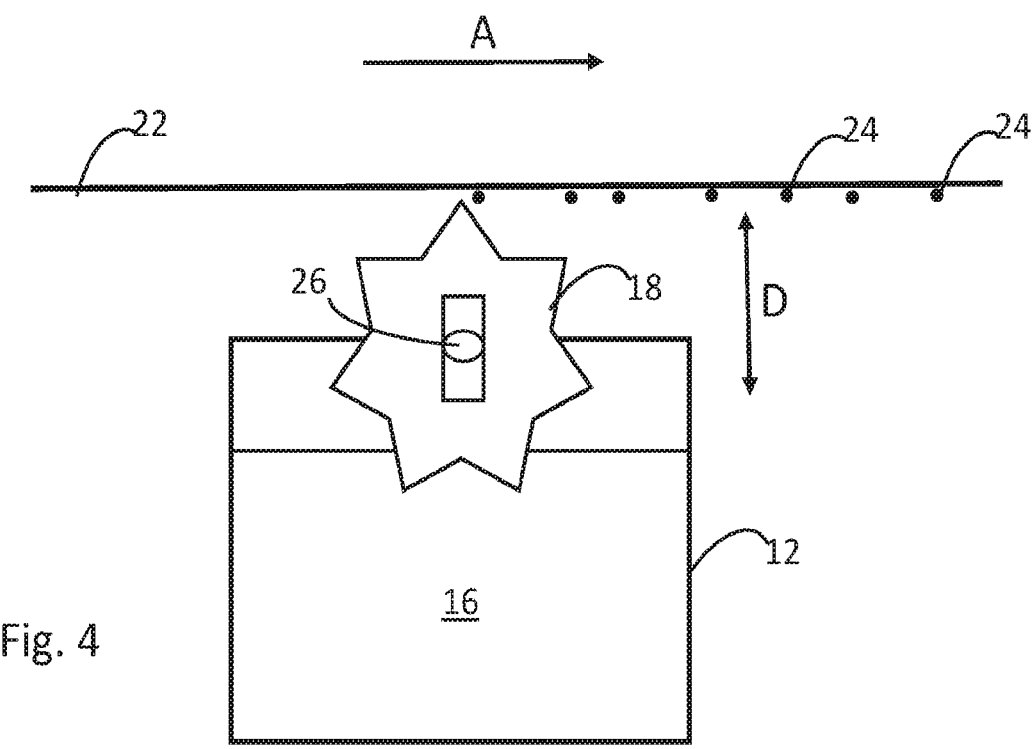
FIG. 4 is an example of an application module.

FIG. 4 shows an application module 12, wherein the starwheel is partially submerged in marking fluid provided in the reservoir 16. In the example application module, the axle 26 of the starwheel 18 may be formed from resilient material, or the axle 26 may be supported in a resilient manner such that the starwheel 18 is movable along a direction D which is substantially perpendicular to the advancement direction A of the medium 22. Thus, during advancement of the medium, the contact force between the starwheel 18 and the medium may vary, which may lead to the starwheel 18 slipping relative to the medium 22 and thus applying marks 24 to the medium 22 at irregular distances between subsequent marks 24, depending on the current amount of slippage between the starwheel 18 and the medium 22. In this manner, an irregular pattern, which facilitates the accurate detection of the advancement speed of the medium 22 using an OMAS 14, can be applied to the backside of the medium 22 in a constructionally simple manner.

Figure 5:
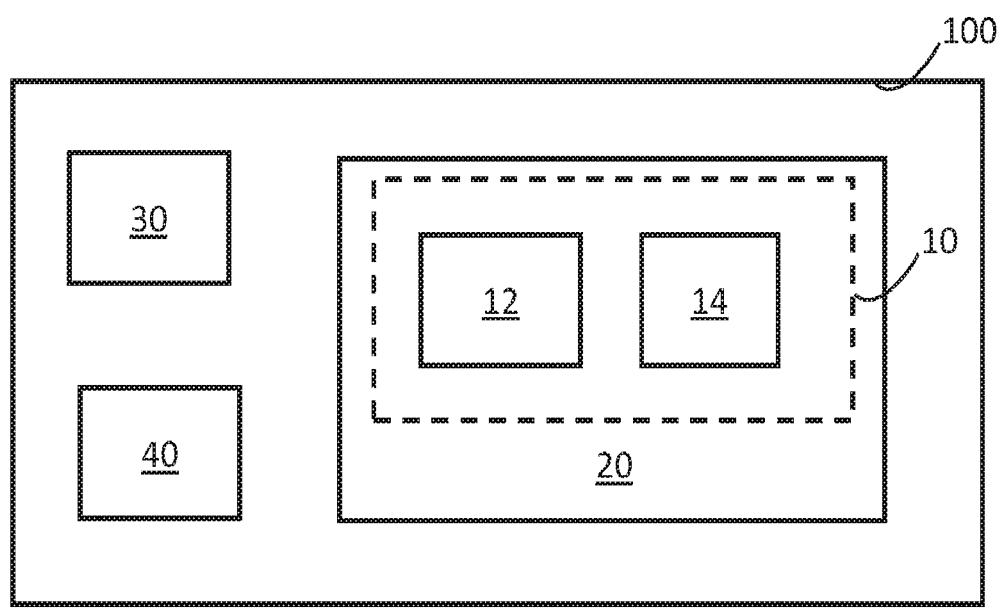
FIG. 5 is an example of a print apparatus comprising an optical sensor device.

FIG. 5 shows an example for a print apparatus 100, which comprises a print head 30 to apply print content onto the printable medium 22. The print head 30 may comprise a page-wide array print head, or a scanning carrier system or the like. The print apparatus 100 further comprises a medium transport mechanism 20 to support and advance the medium 22, which may be formed as a printer platen or as any other medium transport mechanism 20, such as a roller system or the like. An optical sensor device 10 may be provided in conjunction with the medium transport mechanism 20 for detecting an advancement speed of the medium 22. A controller 40 may be in communication with the print head 30, the medium transport mechanism 20 and the optical sensor 10 in order to adjust print positions and medium transport speeds in accordance with the output of the optical sensor device 10.

As described in conjunction with the example optical sensor device 10 shown in FIGS. 1 and 2, the optical sensor 10 comprises the application module 12 for applying an irregular pattern of marks to a surface of a medium and the optical detector module 14 for acquiring images of the applied marks and for determining the advancement speed of the medium based on the acquired images.

Therein, the optical sensor device 10 may be provided as a readily assembled kit, or an application module 12 may be separately supplied to a medium transport mechanism 20 with an existing optical detector module in order to form an optical sensor device 10 as described above. Thus, the accuracy in detection of medium advancement speed of a print apparatus may be enhanced by mounting a separate application module 12 next to an existing optical detector module 14.

In case a page-wide array printer technology is used, the position and motion of the medium 22 may also be detected in a direction perpendicular to the medium advancement direction, in order to ensure a correct alignment of the page-wide print head throughout the printing process. In this case, the OMAS 14 may use the acquired images of the irregular pattern of marks 24 in order to detect a medium position and motion in multiple directions.

The reservoir 16 of the application module 12 used in the print apparatus 100 may be a replaceable or refillable container which is specific to the application module 12, or it may be in contact with a reservoir of e.g. printer ink provided in an inkjet printer, wherein the reservoir 16 may be refilled by printer ink of a specific colour.

Figure 6:
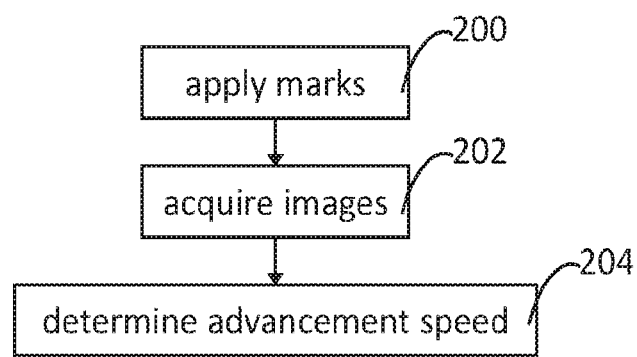
FIG. 6 is a flowchart of an example for a method of determining an advancement speed of a medium.

FIG. 6 shows an example of a method for detecting an advancement speed of a printable medium 22. Therein, in block 200, an irregular pattern of marks 24 is applied to a surface of the medium, such as a backside of the medium 22. Subsequently in block 202, images of the applied marks 24 are acquired using an optical sensor 14. Therein, exposure parameters may be adjusted and the acquired image may be filtered or processed such that the applied marks 24 are easily detectable.

Finally, in block 204, the advancement speed of the medium 22 is determined based on the acquired images of the applied marks 24. According to examples, the irregular pattern of marks 24 may comprise marks 24 with irregular variations in size or shape. According to further examples, the irregular pattern of marks 24 may comprise marks 24 at varying distances between subsequent marks.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. An optical sensor device, comprising:
   an application module for applying an irregular pattern of marks to a surface of a medium; and
   an optical detector module for acquiring images of the applied marks and for determining an advancement speed of the medium based on the acquired images,
   wherein the application module comprises a reservoir and an application device that is in contact with marking fluid provided in the reservoir and with the medium.

2. The optical sensor device according to claim 1, wherein multiple application modules are provided to apply multiple patterns of marks to the surface.

3. The optical sensor device according to claim 2, wherein the multiple application modules are positioned such that the patterns of marks generated by the multiple application modules are spaced in a direction that is substantially perpendicular to the advancement direction of the medium.

4. The optical sensor device according to claim 1, wherein the irregular pattern of marks comprises marks with a variation of different shapes.

5. The optical sensor device according to claim 1, wherein the irregular pattern of marks comprises a variation of distances between adjacent marks.

6. The optical sensor device according to claim 1, wherein the application device comprises a starwheel, which is pivot-mounted in a position wherein it is partially submerged in the marking fluid in the reservoir.

7. The optical sensor device according to claim 6 wherein an axis of rotation of the starwheel is resiliently movable in a direction substantially perpendicular to the advancement direction of the medium.

8. The optical sensor device according to claim 1, wherein a diameter of the applied marks is smaller than 0.2 mm.

\* \* \* \* \*